United States Patent

[11] 3,574,392

| [72] | Inventor | Koki Hirano<br>Fujisawa-shi, Japan |
|---|---|---|
| [21] | Appl. No. | 800,558 |
| [22] | Filed | Feb. 19, 1969 |
| [45] | Patented | Apr. 13, 1971 |
| [73] | Assignee | Jidosha Denki Kogyo Kabushiki Kaisha<br>Totsuka-ku, Yokohama-shi, Kanagawa-ken, Japan |
| [32] | Priority | Feb. 24, 1968 |
| [33] | | Japan |
| [31] | | 43/11653 |

[54] APPARATUS FOR PREVENTING LIFTING OF WIPER BLADES FROM THE WINDSHIELD OF A VEHICLE AT HIGH SPEEDS OF TRAVEL
7 Claims, 5 Drawing Figs.

| [52] | U.S. Cl. | 296/91 |
|---|---|---|
| [51] | Int. Cl. | B60j 1/20 |
| [50] | Field of Search | 296/91, 1 (S) |

[56] References Cited
UNITED STATES PATENTS

| 2,710,772 | 6/1955 | Schulein | 296/91 |
|---|---|---|---|
| 2,757,954 | 8/1956 | Hurley | 296/91 |
| 2,781,227 | 2/1957 | Black | 296/91 |
| 2,823,072 | 2/1958 | Podolan | 296/91 |
| 3,215,377 | 11/1965 | Jarecki | 296/91X |

*Primary Examiner*—Benjamin Hersh
*Assistant Examiner*—John A. Pekar
*Attorney*—Waters, Roditi, Schwartz & Nissen ABSTRACT: A diverting plate is positioned in front of the windshield of a vehicle for being raised to operative position, when the vehicle reaches a predetermined speed, to divert the airflow from the wiper blades of the vehicle so that the latter can be operated without lifting or floating away from the windshield due to the overflow. The diverting plate is hinged and is connected to a displaceable member which is raised at the predetermined speed to tilt the diverting plate upwardly, whereas when the vehicle slows down to a speed substantially below the predetermined speed, the displaceable member is lowered to retract the diverting plate to inoperative position.

PATENTED APR13 1971   3,574,392
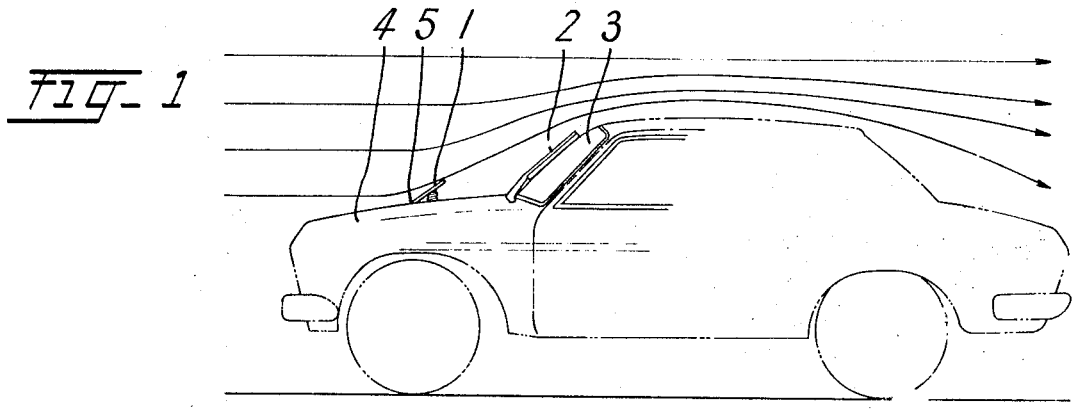
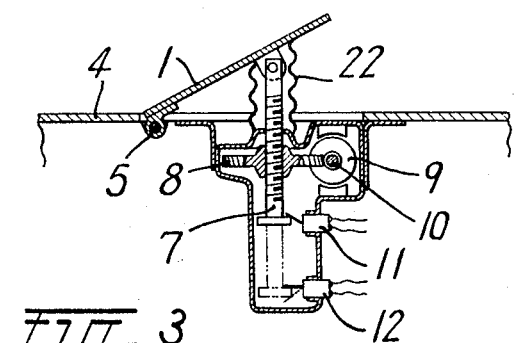
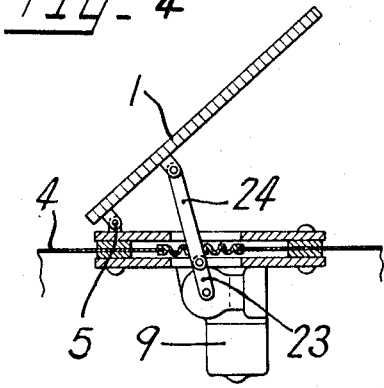
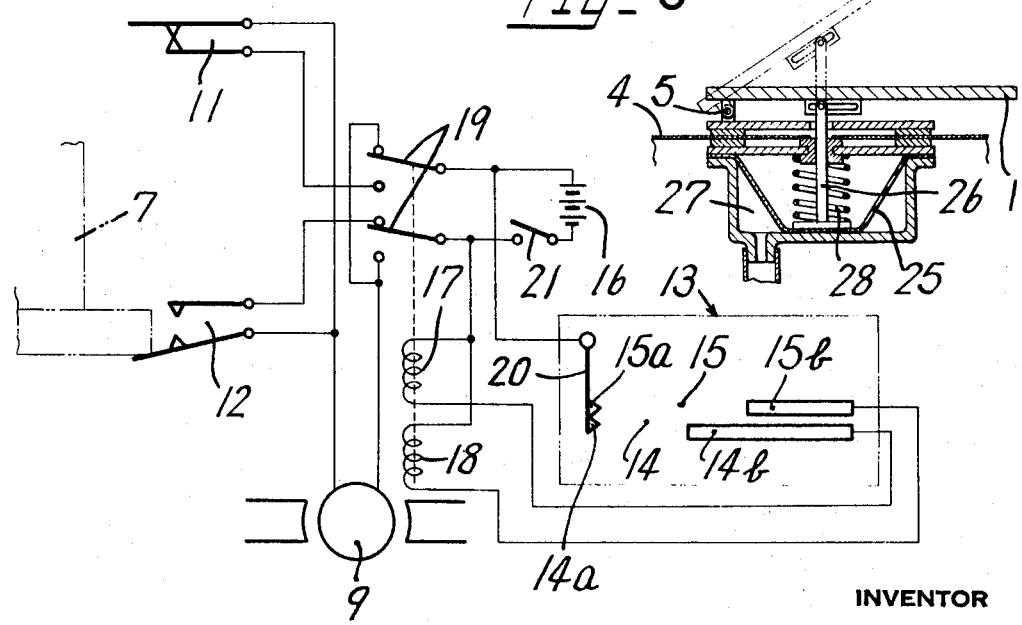
INVENTOR
BY *Koki Hirano*

APPARATUS FOR PREVENTING LIFTING OF WIPER BLADES FROM THE WINDSHIELD OF A VEHICLE AT HIGH SPEEDS OF TRAVEL

BRIEF SUMMARY OF THE INVENTION

This invention relates to apparatus for preventing lifting of wiper blades in the airstream of a traveling vehicle. Hereinafter the vehicle will be considered to be a motor car, although the invention is applicable to other vehicles, such as boats, airplanes and the like.

Due to the high speeds at which motor cars can now travel, the wiper blades are forced to lift or float by the action of the airflow against the front windshield. This causes the wiper blades to become ineffective in clearing the windshield of moisture. For this reason, it has been heretofore proposed to provide the wiper with a pressure plate by which the wiper is pressed against the windshield or alternatively to urge the wiper against the windshield with great pressure by means of a spring or the like. These proposals are not effective because the load on the wiper drive motor becomes increased and also wearing of the wiper blade increases.

An object of the invention is to overcome these defects and the invention is characterized by a movable deflecting plate positioned in front of the windshield of a vehicle and arranged to automatically rise at a predetermined vehicle speed to deflect the airflow away from the wiper blade to prevent lifting thereof.

In accordance with a feature of the invention, the deflecting plate is not lowered to its retracted, inoperative position until the vehicle has slowed down to a speed substantially lower than the speed at which the deflecting plate is raised.

BRIEF DESCRIPTION OF THE DRAWING

FIG. 1 is a side view of one embodying example of the invention;

FIG. 2 is a sectional side view on enlarged scale of a first embodiment of a mechanism for moving a deflecting plate of the example of FIG. 1;

FIG. 3 is an electrical circuit diagram for the control of the mechanism;

FIG. 4 is a sectional side view of a modification of the embodiment of FIG. 2; and FIG. 5 is a sectional side view of another modification of the embodiment of FIG. 2.

DETAILED DESCRIPTION

Embodying examples of this invention will now be explained in detail with reference to the accompanying drawing:

In the drawing numeral 1 denotes a deflecting or diverting plate, which has a front end portion 5 pivotably attached to a hood 4 of the vehicle for being raised or lowered in front of the front windshield 3 provided with a wiper blade 2.

The plate 1 can be raised to an operative position, as shown in FIG. 1, to divert the airflow from the windshield and the wiper blade to prevent lifting or floating of the blade away from the windshield by the airflow. In the inoperative position, the plate is lowered into a position flush with hood 4.

In FIG. 2 there is seen a screw rod 7 attached to the lower surface of the deflecting plate 1, and a worm wheel 8 screwed thereon is in mesh with a worm 10 mounted on a shaft of an electric motor 9. Positioned below motor 9 in the path of travel of the rod 7 are limit switches 11 and 12 which are respectively opened at the upper and lower limit positions of the screw rod 7, that is, the deflecting position where the deflecting plate 1 is raised and the position where the plate 1 is retracted. A switch 13, responsive to vehicle speed, cooperates with the motor 9 and switches 11 and 12, to cause deflecting plate 1 to be raised at a predetermined speed, for example, 40 m.p.h. and is retracted at a predetermined reduced speed, for example, 30 m.p.h.

An electric circuit for such a control operation will now be described in detail with reference to FIG. 3. The car speed switch 13 is composed of a first switch 14 which is to be opened below 30 m.p.h. and a second switch 15 which is to be closed above 40 m.p.h. A first relay 17 is interposed in a circuit which connects the first switch 14 with an electric source 16, and a second relay 18 is interposed in a circuit which connects the second switch 15 with the electric source in parallel with said circuit, and these relays 17 and 18 are arranged to operate a regular and reverse connection changing switch 19, hereafter termed a changeover switch. The limit switch 11 is interposed in the regular connection circuit and the limit switch 12 is interposed in the reverse connection circuit. When the regular connection circuit is closed, the motor is driven in one direction to raise the rod 7 and when the reverse connection circuit is closed, the motor is driven in opposite direction to lower rod 7.

The car speed switch 13 can be constructed by utilizing the speedometer. Namely, an indication needle 20 of the speedometer can be provided with two contacts 14a and 15a, while the speed scale plate of the speedometer is provided with two stationary contacts 14b and 15b so as to form the first and the second switches 14 and 15 by these members. Numeral 21 denotes a power switch which can be closed in conjunction with closing of a switch for operating the wiper motor (not shown), and numeral 22 denotes a bellows covering the screw rod 7 to render the same waterproof.

The operation of the device is as follows:

When the wiper motor switch (not shown) is closed, the power switch 21 for the electric motor 9 is closed in conjunction therewith. If the car speed then increases, the first switch 14 is closed at 30 m.p.h. to energize the first relay 17. This relay 17 is not strong enough to change over the switch 19 so that the switch 19 remains at rest. If the car speed further increases to 50 m.p.h., the second switch 15 is also closed and by the force of the two relays 17 and 18, the changeover switch 19 is activated. By this operation of switch 19, the electric motor 9 is connected to the electric source 16 through the limit switch 11 and is driven in regular rotation thereby driving worm 10, wheel 8 and rod 7 to cause the rear portion of the deflecting plate 1 to move upwards so that the plate 1 is tilted. At its upper limit position, the limit switch 11 is opened by rod 7 to stop the electric motor 9.

In this raised position, the airflow produced by the vehicle speed is deflected away from the front windshield 3 and blade 2, so that lifting or floating of the wiper blade away from the windshield is prevented.

Then, if the car slows down to a speed between 30 and 40 m.p.h., the second switch 15 is opened, but the changeover switch 19 remains at rest, under the action of the first relay 17. Thus, the deflecting plate 1 remains in upwardly tilted position as long as the car speed does not go below 30 m.p.h. When the car speed is decreased below 30 m.p.h., the first switch 14 is also opened and the first relay 17 become inoperative, so that the changeover switch 19 is returned to its initial position under the action of a bias spring (not shown). Thereupon, the electric motor 9 is connected in reverse to the electrical source 16 through the limit switch 12 and motor 9 undergoes reverse rotation, whereby the deflecting plate 1 is lowered and at its lower limit position the limit switch 12 is opened by rod 7 to stop the motor.

Thus, when the deflecting plate 1 is raised at a predetermined vehicle speed, i.e., 40 m.p.h., the plate remains raised for all speeds thereabove and for speeds therebelow exceeding 30 m.p.h. Therefore, there will be no chattering of the blade, as would be the case where the deflecting plate is swung up and down at a single predetermined speed.

FIG. 4 shows a modification in which the deflecting plate 1 is moved up and down by the electric motor 9 through a crank mechanism 23 and a connecting rod 24. FIG. 5 shows a modification in which plate 1 is moved up and down by a pressure fluid by a diaphragm 25 and a connecting rod 26, as shown in FIG. 5. Numeral 27 denotes a pressure chamber containing diaphragm 25 and 28 denotes a return spring acting on diaphragm 25.

According to the invention, a hinged deflecting plate is provided in front of a windshield of a motor car and is adapted to be raised automatically at a predetermined high speed, so that at any speed above said predetermined speed the airflow is deflected from the windshield and the wiper blades and lifting or floating of the wiper blade is prevented, whereby satisfactory wiper action can be obtained with no increase of load on the wiper driving motor and with decrease of the wear of the wiper. Additionally, the deflecting plate is automatically retracted at a predetermined lower speed so that the plate does not construct an obstacle and does not spoil the appearance of the car. A further advantage of the deflecting plate is that dust and small insects or the like are diverted away from the windshield to keep the windshield clear.

I claim:

1. Apparatus for preventing lifting of a wiper blade from the windshield of a vehicle, due to the high speed travel of the vehicle, said apparatus comprising diverting means in the airstream directing the airflow away from the windshield to prevent lifting of the blade therefrom, said diverting means having a retracted inoperative position and an extended operative position, and means for moving the diverting means from said inoperative to said operative position when the vehicle reaches a predetermined speed, said means for moving the diverting means comprising a displaceable member coupled to the diverting means to retract and extend the same, and stop means for limiting the movement of said displaceable member between end positions corresponding respectively to the retracted and extended positions of the diverting means, said diverting means comprising a hinged plate positioned in front of the windshield relative to the direction of travel of the vehicle, said displaceable member being connected to said hinged plate to pivot the same between the retracted and extended positions, said means for moving the diverting means further comprising a drive means for said displaceable member, said stop means comprising switch means at each of said end positions for halting the displaceable member when the latter is at said end positions.

2. Apparatus as claimed in claim 1, wherein said drive means comprises a motor, a power source for said motor, a changeover switch between said motor and said power source for normal and reverse directions of rotation of said motor, first and second relays coupled to said changeover switch to change the position thereof for driving of the motor in normal and reverse directions, and a switch responsive to vehicle speed between the relays and source for selective connection of said relays with said source.

3. Apparatus as claimed in claim 2, wherein said switch means of said stop means comprises two switches respectively connected by said changeover switch in series with said motor and source.

4. Apparatus as claimed in claim 1, wherein said drive means moving said diverting means from the operative position to said inoperative position at a speed substantially lower than the predetermined speed at which the diverting means is moved from the inoperative position to the operative position.

5. Apparatus as claimed in claim 1, wherein said vehicle has a hood in front of the windshield relative to the direction of travel of the vehicle, said hinged plate in said inoperative position being retracted flush with said hood and in said operative position being raised from said hood.

6. Apparatus for preventing lifting a wiper blade from the windshield of a vehicle, due to the high speed travel of the vehicle, said apparatus comprising diverting means in the airstream directing the airflow away from the windshield to prevent lifting of the blade therefrom, said diverting means having a retracted inoperative position and an extended operative position, and means for moving the diverting means from said inoperative to said operative position when the vehicle reaches a predetermined speed, said means for moving the diverting means comprising a displaceable member coupled to the diverting means to retract and extend the same, and stop means for limiting the movement of said displaceable member between end positions corresponding respectively to the retracted and extended positions of the diverting means, said diverting means comprising a hinged plate positioned in front of the windshield relative to the direction of travel of the vehicle, said displaceable member being connected to said hinged plate to pivot the same between the retracted and extended positions, said means for moving the diverting means further comprising a rotatable drive means for said displaceable member, and a crank mechanism coupled to said drive means and said displaceable member, the latter constituting a connecting rod.

7. Apparatus for preventing lifting of a wiper blade from the windshield of a vehicle, due to the high speed travel of the vehicle, said apparatus comprising diverting means in the airstream directing the airflow away from the windshield to prevent lifting of the blade therefrom, said diverting means having a retracted inoperative position and an extended operative position, and means for moving the diverting means from said inoperative to said operative position when the vehicle reaches a predetermined speed, said means for moving the diverting means comprising a displaceable member coupled to the diverting means to retract and extend the same, and stop means for limiting the movement of said displaceable member between end positions corresponding respectively to the retracted and extended positions of the diverting means, said diverting means comprising a hinged plate positioned in front of the windshield relative to the direction of travel of the vehicle, said displaceable member being connected to said hinged plate to pivot the same between the retracted and extended positions, said means for moving the diverting means further comprising a pressure chamber, and an elastic diaphragm in said chamber engaging said displaceable member to move the same between said end positions as the chamber is pressurized and depressurized.